June 27, 1933.  B. BLEUSTEIN  1,915,286
BABY CARRIAGE BRAKE CONSTRUCTION
Filed Jan. 9, 1932  2 Sheets-Sheet 2
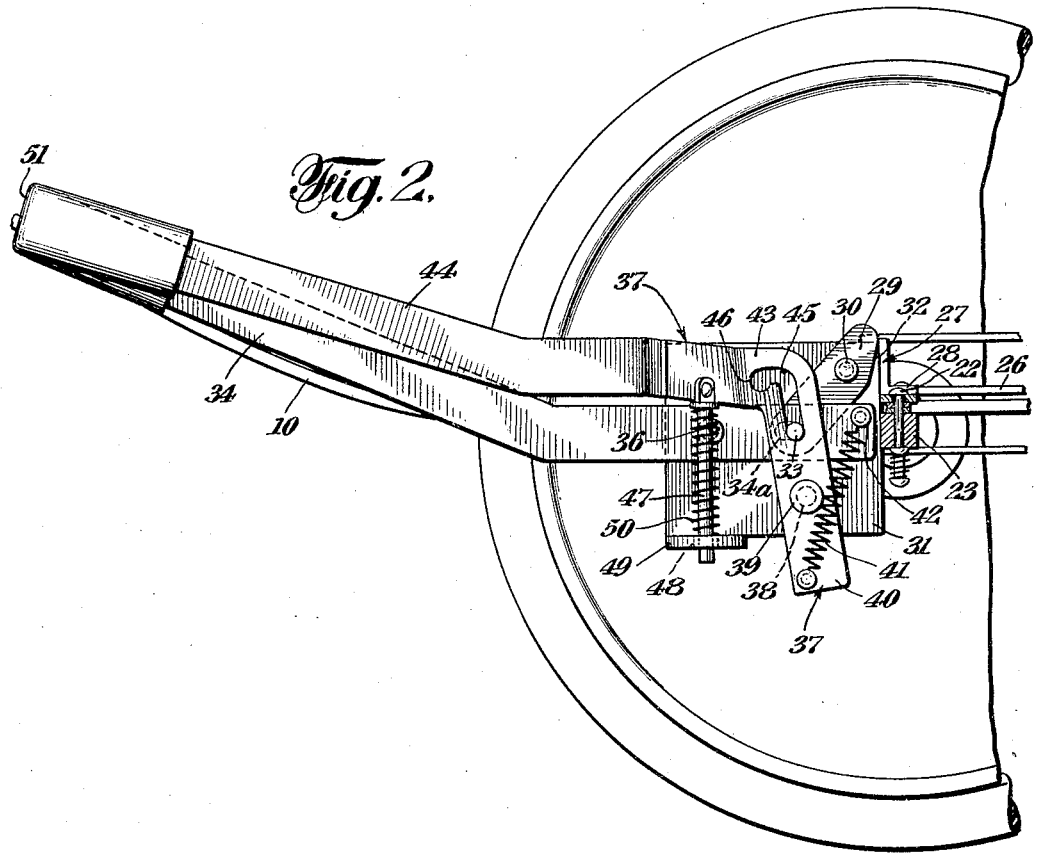
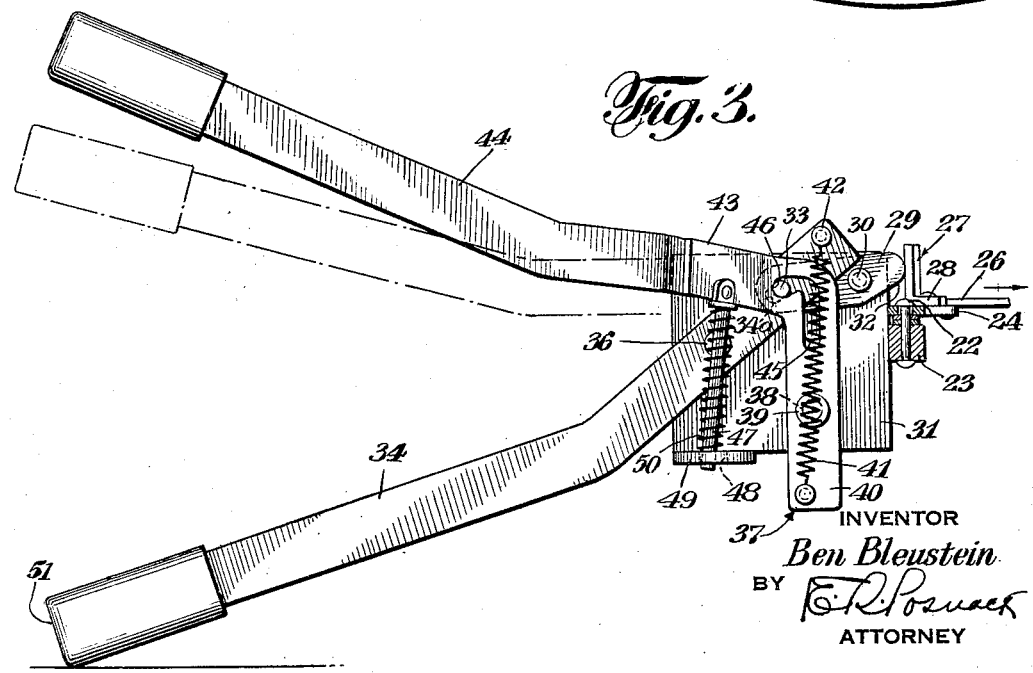
INVENTOR
Ben Bleustein
BY
ATTORNEY Patented June 27, 1933

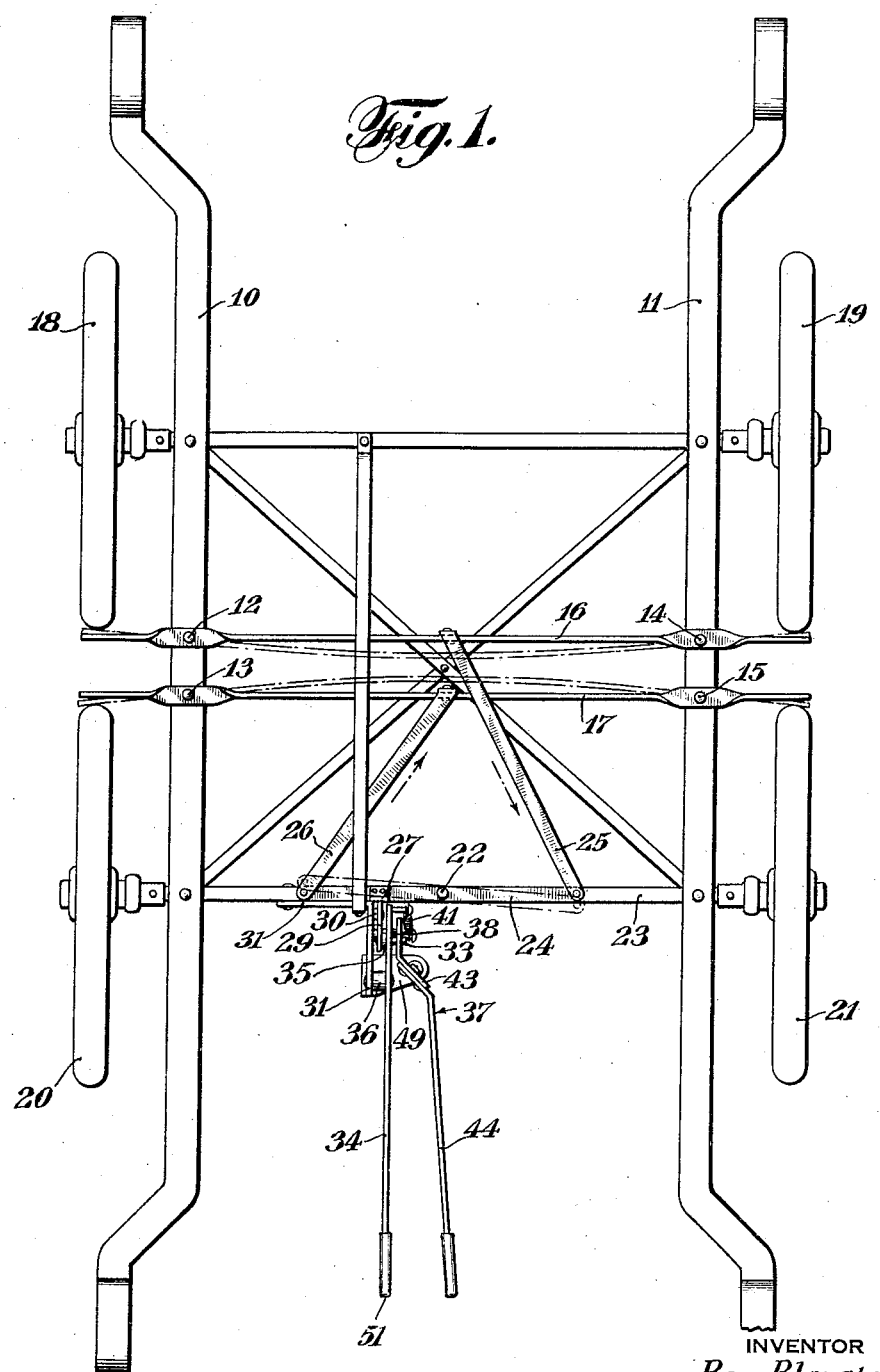

1,915,286

UNITED STATES PATENT OFFICE

BEN BLEUSTEIN, OF NEW YORK, N. Y.

BABY CARRIAGE BRAKE CONSTRUCTION

Application filed January 9, 1932. Serial No. 585,684.

This invention relates to improvements in brake constructions, particularly of the kind used on baby carriages,—an object of my invention being to enable a brake of this class to be readily and easily applied and safely and securely held locked in its operative position. Another object is to permit both the locking and brake releasing operations to be effected by a downward pressure of a lever, thereby permitting the weight of the body to aid in its operation, and eliminating the usual wear and tear of the upper part of a shoe occurring in constructions requiring an upward lift of a foot lever to release the brake from its holding position.

It is still a further object of my invention to present a construction having a lever serving the double function of actuating the brake mechanism and serving as a supporting leg contacting with the ground when the brake is in its operative position. Other objects, features and advantages will appear from the drawings and the description hereinafter given.

Referring to the drawings,

Figure 1 is a plan view of the running gear of a perambulator showing the brake construction constituting my invention, the dotted lines showing the brake beams flexed in their operative positions.

Figure 2 is an enlarged fragmentary side view of Figure 1, showing the parts in their normal, inoperative positions.

Figure 3 is an enlarged fragmentary side elevation similar to Figure 2, illustrating the parts in their operative positions with the brake lever contacting the ground, the dotted lines showing the projected position of the release bar.

In the drawings, the longitudinal side bars 10 and 11 of the running gear frame have pivotally attached thereto, at points 12, 13, 14 and 15, the transverse flexible brake beams 16 and 17, the end portions of the former being adapted for engagement with the forward wheels 18 and 19, and that of the latter, 17, being engageable with the rear wheels 20 and 21. Pivotally mounted at 22 on the rear axle 23, and substantially parallel thereto, is the lever 24 having pivotally connected at its extremities the connecting links 25 and 26, the former being attached to forward brake beam 16 and the latter to the rear beam 17.

Affixed to said lever 24 and extending upwardly therefrom is the plate 27, shown on the drawings as an angle plate with its base 28 secured to said lever. The lever cam 29, pivotally mounted at 30 on the rearwardly extending portion of the bracket 31 attached to said axle 23, contains the face 32 which is slidably engageable with the rear surface of said plate 27. At the end opposite said face is affixed the pin 33 over which is pivotally mounted the brake lever 34 adjacent the boss or collar 35,—the pin passing through the slotted opening 34a in said brake lever. The said brake lever is pivotally mounted on the bracket 31, being attached to the shaft 36 which is rotatably secured to said bracket. It is to be noted that the said shaft serves as a spacer between the bracket 31 and the lever 34, so as to enable said lever to clear the thicknesses of lever cam 29 and collar 35 for pivotal engagement with said pin 33.

The slotted release lever 37 is rotatably mounted on the shaft 38 which is affixed to the bracket 31 and has secured at its free end the collar 39 against which said release lever is abuttable. To the lower extremity of the vertical portion 40 of said lever is attached the bottom end of the spring 41, the upper end of which is attached to the extremity of said brake lever at 42. The said release lever 37 contains an arm 43 at substantially right angles to the said vertical portion 40 and bent away from the brake lever 34 a sufficient distance to prevent the latter's interference with the movement of the release bar 44. It should be noted that although the bar 44 is shown as a separate part attached to lever 37, it can be made as a continuation of and integral with said lever.

The release lever 37 contains the slot 45 through which the said pin 33 extends and with which it is slidably and frictionally engageable. The said slot has a bend therein and is V-shaped, having a portion that is substantially vertical and coextensive at its top with a substantially horizontal portion extending rearwardly and containing at its terminal a recess or notched portion 46 adapted to receive said pin 33.

Attached to the release lever is the upper end of the rod 47, the lower end of which extends through and is slidably engageable with the hole 48 in the release bracket 49 attached to bracket 31 and extending transversely and at right angles therefrom. The helical spring 50 is mounted over said rod, the upper end being in abutment with the lower edge of the release lever 37, and the lower end with the upper surface of bracket 49.

Normally, that is when the device is in its inoperative position, the spring 41 need not be in tension, although it may be slightly so to help hold the brake lever 34 in its released position; and normally, the spring 47 may be slightly compressed so as to help hold the release bar in its raised position. However, the friction between contacting parts will ordinarily hold the parts against movement.

To operate this device, the brake lever 34 is pressed downwardly by applying a foot against the extremity 51 thereof and moving it downwardly as far as it will go, at which point the said extremity will contact with the ground and thereby serve as an additional support to prevent a backward tilting of the carriage. The extremity 51 should preferably be made of rubber so as to provide a good frictional engagement with the ground; and the brake lever should be centrally located with respect to the frame in order to constitute a well balanced support.

The said downward pressure of the lever 34 will cause a pivotal movement thereof about the axis of the shaft 36, and a consequent upward movement of the forward part of said brake lever against the action of the spring 41, thereby actuating the pin 33 upwardly. As this pin is attached to the cam lever 29 which is pivoted at 30, the only possible upward movement of said pin is along an arcuate path the center of which is 30, so that said movement has a rearward component. The pin will hence move upwardly within the slot 45 and exert a rearward pressure against the rear wall thereof, resulting in a rearward pivotal movement of the release lever 37 against the action of spring 50. This movement continues until the pin reaches the horizontal portion of slot 45 at which point the vertical rear wall of the slot will be out of engagement with the pin, thereby permitting the upward pressure of spring 50 to force the release lever 37 to move in a clockwise direction until the pin contacts with the rearmost extremity of the horizontal portion of said slot. As the spring 50 is under compression and hence actuates the arm 43 of the release lever upwardly, it will force the notched portion 46 against the pin which will now be held against movement. It is thus evident that the mechanism is now safely locked in position, with the brake lever 34 firmly held in its position contacting with the ground, and the brake mechanism securely locked in its projected operative position, as will be hereinafter set forth.

It should be noted that the lever arm extending from the pivot at 30 to the pin 33 is in a substantially horizontal position when the device is in its locked position, as in this way can there be obtained the greatest movement rearwardly of the pin with the greatest movement of the cam face 32 forwardly to procure a more powerful braking effect, as will be more readily understood from the description of the braking operation hereinafter given. A smaller arcuate movement of said lever arm will cause a smaller rearward movement of the pin and a smaller forward movement of the cam face 32, and a larger arcuate movement might cause a slight forward return movement of said pin after the rearmost point is reached, and a slight rearward recession of the cam face after its extreme forward point is reached with a consequent relaxation of the brakes against the wheels.

When the brake lever 34 is actuated downwardly, the lever cam 29 is caused to rotate in a clockwise direction, so that the cam face 32 is forced against the plate 27 to move it forwardly. This results in a movement of the lever 24 about its pivot, drawing the link 25 rearwardly and pushing the link 26 forwardly, and as these two links are attached to the flexible brake beams 16 and 17, the former will be flexed rearwardly so that the ends thereof will contact with the forward wheels 18 and 19, and the latter will be flexed forwardly so that the ends thereof will contact with the rear wheels 20 and 21.

To release the mechanism from its operative position, downward pressure is applied to the release bar 44, thereby actuating the release lever 37 in a counterclockwise direction to cause a release of the pin 33 from its position in recess 46, and moving the horizontal portion of slot 45 rearwardly with respect to the pin until said pin passes over the bend in the slot. At this point, there being nothing to resist the downward movement of the pin, it is caused to snap down into the vertical portion of the slot due to the action of the spring 41 upon the forward end of the brake lever 34 which is slidably and pivotally operable upon the pin through the slotted opening 34a, as previously explained. The brake lever 34 is now in its raised and inoperative position. The release bar 44 is also in its raised position due to the upward action thereon of the spring 50.

It will be noticed that the release mechanism can not of itself snap back, and that the danger of accidentally setting it off is reduced to a minimum, as the release can only be effected by a positive and deliberate downward pressure of the release pedal. Both the brake and release levers are actuated downwardly, rendering it easier to operate and less damaging to the shoes than in cases where the release can only be effected by an upward movement of the brake lever.

This invention is not limited to the specific construction herein described, as other and different mechanical embodiments thereof may be employed within the scope of the appended claims.

What I claim is:

1. In a brake construction of the class described, two flexible transverse brake beams each having its two end portions adjacent the peripheries of a pair of wheels and frictionally engageable therewith, a lever pivotally attached to the rear axle of the carriage and having its ends pivotally connected to the ends of two links the opposite ends of which are affixed to one and the other of said brake beams respectively, a plate secured to said lever, a cam operable upon and coacting with said plate to cause a rotation of said lever about its pivot and a consequent forward movement of one and a rearward movement of the other of said links to actuate the respective brake beams to which said links are attached to effect the said frictional engagement between the brake beams and wheels.

2. In a brake construction of the class described, two brake beams having their end portions adjacent the peripheries of a pair of wheels and frictionally engageable therewith, a lever pivotally attached to the rear axle of a carriage, pivotal connecting means joining said lever with said beams and adapted to actuate said beams upon a movement of said lever, a plate secured to said lever, a lever cam engageable and coacting with said plate to cause a movement of said lever, a pivotally mounted brake lever operable upon said cam to cause a movement thereof to actuate said plate.

3. In a baby carriage brake construction, a brake beam having a portion thereof adjacent the periphery of a wheel and engageable therewith, a pivotally mounted lever cam having a cam face thereon and containing a pin extending therefrom, a plate adjacent said cam face and adapted for engagement therewith, a movable mounting for said plate, connecting means between said mounting and said brake beam for actuating said beam upon a movement of said mounting, a pivotally mounted brake lever containing a slotted aperture therein through which said pin extends and with which it is in slidable and rotatable engagement, the relative positions of the pivotal mountings of said cam and brake lever being such that a downward movement of the brake lever will rotatably actuate said cam and cause an engagement of the cam face thereof with said plate to produce a movement of said mounting.

4. In a baby carriage brake construction, a brake beam having a portion thereof adjacent the periphery of a wheel and engageable therewith, a pivotally mounted lever cam, a plate adjacent the face of said cam and operatively engageable therewith, a movable mounting for said plate, connecting means between said mounting and said brake beam for actuating said beam upon a movement of said mounting, a pivotally mounted brake lever, means on said cam operatively connected to said brake lever whereby a movement of said lever will rotatably actuate said cam and cause an engagement thereof with said plate to effect a movement of said mounting, said lever being of such a length that when moved downwardly it will, at the end of its down stroke, be in engagement with the ground.

5. In a baby carriage brake construction, a bracket attached to the rear axle of a carriage and having a vertical wall thereof extending rearwardly therefrom, said wall having pivotally connected thereto a lever cam, a brake lever, and a release lever; braking means operative upon the wheels of the carriage; a cam plate; movable connecting means between said braking means and said plate; said cam being adjacent to and operatively engageable with said plate; means on said cam operatively connected to said brake lever and said release lever whereby a movement of either of said levers will rotatably actuate said cam for coaction with said plate, thereby causing a movement of said connecting means to actuate said braking means.

6. In a baby carriage brake construction, braking means operative upon the wheels of the carriage; a cam plate; a movable mounting for said plate; connecting means between said mounting and said brake beam for actuating said beam upon a movement of said mounting; a lever cam having a face thereof engageable with said plate upon a turning of said cam, and a pin extending therefrom; a brake lever having a slotted aperture therein; a release lever containing a bent slot extending upwardly and thence rearwardly and terminating in a notched recess; said pin extending through said aperture and said slot and being adapted for pivotal and slidable engagement with said aperture and slidable engagement with said slot; the relative position of the parts being such that a movement of said brake lever will actuate said pin to cause a rotation of said cam and a consequent sliding movement of the pin within said slot until it comes into engagement with said recess; and yieldable means operable upon said release lever to hold the wall of said recess in engagement with said pin.

7. In a baby carriage brake construction, braking means operative upon the wheels of the carriage; a cam plate; a movable mounting for said plate; connecting means between said mounting and said brake beam for actuating said beam upon a movement of said mounting; a lever cam having a face thereof engageable with said plate upon a turning of said cam, and a pin extending from said cam; a brake lever having a slotted aperture therein; a release lever containing a slot having a substantially right angle bend therein and terminating at the end thereof in a notched recess; yieldable means operable upon said brake lever and said release lever to normally hold them in their inoperative positions; the said pin extending through said aperture and said slot; the relative position of the parts being such that a movement of said brake lever will actuate said pin to cause a rotation of said cam and a consequent sliding engagement of the pin against a wall of said slot causing a movement of said release lever against the action of said yieldable means until the pin enters said bend and engages said recess, said yieldable means holding the walls of said recess against said pin.

8. A brake mechanism for a baby carriage comprising brake bars, a brake lever reversely connected to said bars, a cam lever to move said brake lever, a foot-operated lever to move said cam lever, means to lock said parts in braking position, and manual means to release said brake mechanism.

9. A brake mechanism for a baby carriage comprising brake bars, a brake lever reversely connected to said bars, a cam lever to move said brake lever, a foot-operated lever to move said cam lever, a locking plate effective to lock said parts in braking position, and manual means to move said locking plate reversely to release said brake mechanism.

10. A braking mechanism for a baby carriage comprising braking devices, means to apply the brakes, means to positively lock said brakes in applied position, said locking means comprising a pivoted locking plate having an L-shaped slot therein, and a spring to move said plate to locking position when the brakes are applied.

BEN BLEUSTEIN.